Patented July 28, 1953

2,647,129

UNITED STATES PATENT OFFICE 2,647,129

ETHERS AND PROCESS FOR MAKING THE SAME

Joseph T. Bashour, New York, N. Y., assignor to Stauffer Chemical Company, a corporation of California No Drawing. Application July 10, 1951,
Serial No. 236,058

12 Claims. (Cl. 260—327)

This invention relates to a novel group of ethers and to a process for making the same.

The ethers of the present invention can be considered as derivatives of ethylene trithiocarbonate. Ethylene trithiocarbonate is properly named 1,3-dithiolane-2-thione, and consists of a ring having the following configuration in which the various positions can be numbered, as shown:

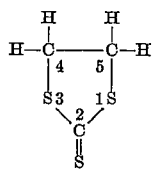

The compounds of the present invention are characterized by having a substituent in the No. 4 position, the substituent consisting of a methylene group to which an organic radical is linked by means of an oxygen bridge. Thus, the compounds of the present invention have the following general structure:

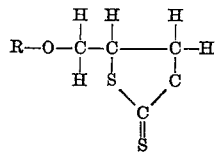

In the above formula, R can be any organic radical including alkyl radicals such as methyl, ethyl, isopropyl, butyl, pentyl, heptyl, cyclohexyl, octyl, crotyl, or allyl; aryl radicals such as phenyl, naphthyl, phenanthryl, or anthracyl; alkaryl radicals such as tolyl, ethylphenyl, dimethyl phenyl, diethyl phenyl, or cumyl; arakyl radicals such as benzyl and heterocyclic radicals such as furyl, pyridyl, pyranyl or pyrryl. In addition, the organic radical R may have attached thereto one or more functional groups as a chloro, nitro, aceto or methoxy group. Further, the radical R may itself contain additional radicals linked by one or more oxygen or sulfur bridges so that R could, for instance, be a polyoxyethylene radical.

In general, the compounds of the present invention may be made by reacting an alkali metal alkyl xanthate with the appropriate glycidyl ether having the following general structure:

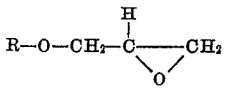

It is apparent that in the above formula for the glycidyl ether, the R is chosen to correspond with the desired radical, R, of the ultimate trithiocarbonate derivative. The glycidyl ether is added to a solution of an alkali metal xanthate in alcohol or other suitable solvent. The reaction is exothermic. The reaction mixture is allowed to stand at from about 20° C. to about 40° C., although higher temperatures may be employed, if desired, for a period of about one to about twenty-four hours, preferably about 14 to 16 hours. At the conclusion of this reaction period the reaction mixture is diluted with water. If the reaction product is a solid, it may be obtained directly from the aqueous mother liquor by filtration. In the event a non-solid reaction product is formed, it can be conveniently isolated by extraction with a suitable water immiscible solvent such as benzene, followed by distillation which may be under reduced pressure.

The following non-limiting example illustrates the method of preparation of 4-(4-chlorophenoxymethyl)-1,3-dithiolane-2-thione:

*Example 1.*—The appropriate glycidyl ether was first prepared by dissolving 128.6 grams (1 mol) of p-chlorophenol in a solution of 51.5 grams (1.25 mol) of sodium hydroxide in 1,000 cc. of water. To this solution was added 92.5 grams (1 mol) of epichlorohydrin. The reaction mixture was stirred for eleven hours and let stand for three days. The mixture separated into two phases. The lower, oily phase was removed, mixed with powdered sodium hydroxide and agitated for a period of two hours. The oil was then dissolved in ether, the ether solution was washed with water until the wash was neutral, and dried with anhydrous potassium carbonate. After removing the ether, the residual oil was vacuum distilled to yield 99 grams of p-chlorophenyl glycidyl ether.

A solution of sodium methyl xanthate in 500 c. c. of methanol was made from 57.7 grams (1.07 mol) of sodium methylate and 84 grams (1.1 mol) of carbon disulphide. To this solution was added the 99 grams (0.54 mol) of p-chlorophenyl glycidyl ether prepared above. An exothermic reaction occurred. The mixture was let stand overnight and the product was then heated to reflux, cooled, and diluted with water. The oil was drawn off, dissolved in benzene, and dried by distillation of the benzene-water azeotrope. The benzene was completely removed by vacuum distillation. The product, a yellow viscous oil, weighed 112 grams, giving a yield of 40.5%. Using a similar procedure, the following compounds were prepared having the yields and melting points shown:

Table

| Example | Melting Point | Yield, Percent |
|---|---|---|
| 2. 4-(4-nitrophenoxymethyl)-1,3-dithiolane-2-thione. | 121-3° C. | 13.2 |
| 3. 4-(4-methoxyphenoxymethyl)-1,3-dithiolane-2-thione. | 69-9° C. | 9.4 |
| 4. 4-isopropoxymethyl-1,3-dithiolane-2-thione. | (oil) | 74 |
| 5. 4-phenoxymethyl-1,3-dithiolane-2-thione. | (oil) | 31.6 |

The temperature at which the reaction is carried out is not critical and, as has been mentioned above, the reaction is exothermic so that ordinarily no heating is required. However, the reaction goes faster at elevated temperatures and the reaction may be carried out at temperatures up to the reflux temperature of the reaction mixture. The reaction can be conducted at subatmospheric, atmospheric or elevated pressures, although I ordinarily prefer to operate at atmospheric pressure. Molar quantities of the reactants are preferred although the reaction will proceed in quantities considerably removed from the stoichiometric ratio.

The compounds of the present invention are useful as intermediates in the preparation of other compounds, as fungicides and insecticides. In addition, the compounds of the present invention may be employed as plasticizers.

I claim:
1. As a new composition of matter, a compound having the formula:

$$R-O-\underset{H_2}{C}-\underset{S}{\overset{H}{C}}\underset{\diagdown\underset{\parallel}{C}\diagup}{\phantom{X}}\underset{S}{\overset{}{C}}=H_2$$

wherein R is a member chosen from the group consisting of lower alkyl radicals, phenyl radical, 4-halophenyl radicals, 4-nitrophenyl radical and 4-lower alkoxyphenyl radicals.

2. As a new composition of matter 4-(4-chlorophenoxymethyl)-1,3-dithiolane-2-thione.

3. As a new composition of matter 4-(4-nitrophenoxymethyl)-1,3-dithiolane-2-thione.

4. As a new composition of matter 4-(4-methoxyphenoxymethyl)-1,3-dithiolane-2-thione.

5. As a new composition of matter 4-isopropoxymethyl-1,3-dithiolane-2-thione.

6. As a new composition of matter 4-phenoxymethyl-1,3-dithiolane-2-thione.

7. The process of preparing an ether having the formula:

$$R-O-\underset{H_2}{C}-\underset{S}{\overset{H}{C}}\underset{\diagdown\underset{\parallel}{C}\diagup}{\phantom{X}}\underset{S}{\overset{}{C}}=H_2$$

comprising reacting a glycidyl ether having the formula:

$$R-O-CH_2-\underset{}{\overset{H}{C}}\underset{\diagdown O \diagup}{\phantom{X}}CH_2$$

with an alkali metal xanthate; in each of the above structural formulas, R represents the same member chosen from the group consisting of lower alkyl radicals, phenyl radical, 4-halophenyl radicals, 4-nitrophenyl radical and 4-lower alkoxyphenyl radicals.

8. The process of making 4-(4-chlorophenoxymethyl)-1,3-dithiolane-2-thione comprising reacting p-chlorophenyl glycidyl ether with an alkali metal xanthate.

9. The process of making 4-(4-nitrophenoxymethyl)-1,3-dithiolane-2-thione, comprising reacting p-nitrophenyl glycidyl ether with an alkali metal xanthate.

10. The process of making 4-(4-methoxyphenoxymethyl)-1,3-dithiolane-2-thione, comprising reacting p-methoxyphenyl glycidyl ether with an alkali metal xanthate.

11. The process of making 4-isopropoxymethyl-1,3-dithiolane-2-thione comprising reacting isopropyl glycidyl ether with an alkali metal xanthate.

12. The process of making 4-phenoxymethyl-1,3-dithiolane-2-thione comprising reacting phenyl glycidyl ether with an alkali metal xanthate.

JOSEPH T. BASHOUR.

References Cited in the file of this patent

UNITED STATES PATENTS

| Number | Name | Date |
|---|---|---|
| 2,193,415 | Coltof | Mar. 12, 1940 |

OTHER REFERENCES

Culvenor et al., vol. 41 (1947), Cl. 1608.
Culvenor et al., vol. 43 (1949), Cl. 7420.